F. DIETZ.
Corn and Potato Coverers.
No. 151,104.                               Patented May 19, 1874.
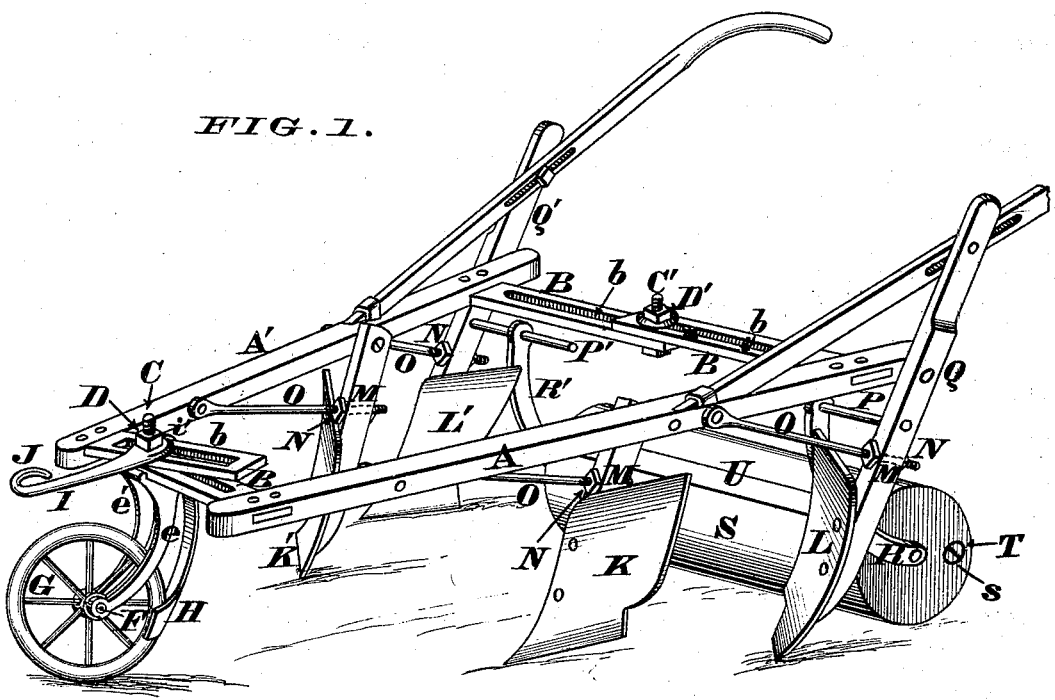
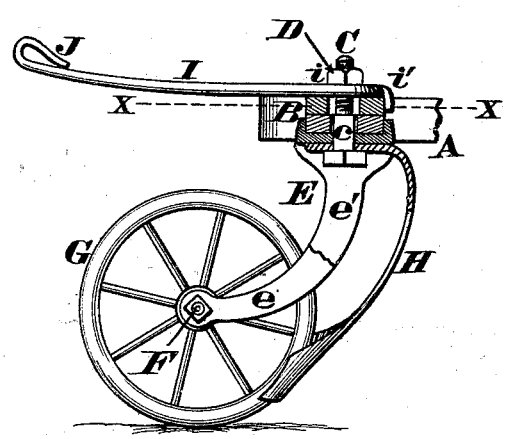
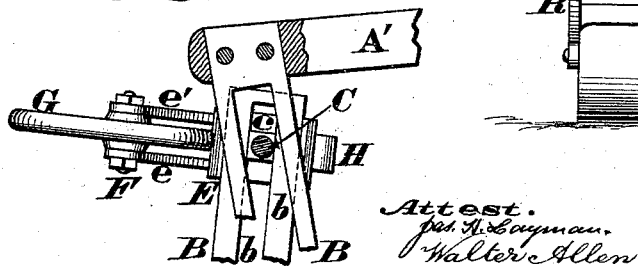

UNITED STATES PATENT OFFICE.

FRIEDRICK DIETZ, OF ELEANOR, OHIO.

IMPROVEMENT IN CORN AND POTATO COVERERS.

Specification forming part of Letters Patent No. 151,104, dated May 19, 1874; application filed April 21, 1874.

*To all whom it may concern:*

Be it known that I, FRIEDRICK DIETZ, of Eleanor, Clermont county, Ohio, have invented a new and useful Machine for Planting and Covering Potatoes, &c., of which the following is a specification:

This is an improvement in those implements for planting and covering of potatoes, corn, and other root and grain crops, which comprise a guide-wheel, a pair of scraping and a pair of covering shares, and a roller; and my invention relates to an improved arrangement of adjustable guide-wheel, adjustable shares, and a separable gravitating-roller, as hereinafter fully set forth.

In the accompanying drawings, Figure 1 is a perspective view of my implement. Fig. 2 is a vertical section through the adjustable guide-wheel and its accessories. Fig. 3 is a horizontal section of the same at the line X X. Fig. 4 is a diagram of the rear portion of the implement, the side beams being represented in their expanded condition, and one of the arms of the hanger shown in the act of disengagement from its pivot. Fig. 5 is another diagram of the rear portion of the implement, the side beams thereof being shown in their contracted condition.

Of the above illustration, Figs. 2 and 3 are drawn on an enlarged scale.

A A' are two similar beams, which are coupled to one another by means of cross-bars, B, four in number—two bars on one beam overlapping two on the other beam, and each bar having a slot, $b$, which receives a screw-bolt, C or C', having a nut, D or D'. These bolts and nuts serve to clamp the bars of each respective pair firmly together, the slots $b$ enabling the beams to be set more or less distant, and either parallel to one another, or diverging either forward or rearward, at the husbandman's discretion. The screw C, which clamps the forward pair of bars, serves also to secure and hold in place the hanger E, whose two arms, $e$ $e'$, extend downward and forward, as shown, and carry at their lower extremities the axle F of my guide-wheel G. The same screw C also, in conjunction with said hanger, serves to secure and hold a spring-scraper, H, whose lower extremity is adapted, by form and position, to press and grasp that portion of the guide-wheel's periphery slightly in rear of its point of contact with the ground. The said screw also coacts with the upper bar to clamp a clevis, I, having an orifice, $i$, for said screw, a lip, $i'$, to engage behind said bar, and an eye, J, for engagement of the team. The said guide-wheel, with the above-described attachments, (scraper and clevis,) may be fixed at the precise longitudinal center of the implement, or to one or other side, according to the kind of work to be performed. When set to the right or to the left hand, any side draft thereby arising may be compensated by a slight convergence of the forward ends of the beams, as represented in Figs. 1 and 3, so as to give the guide-wheel an obliquity reverse to the said side draft, and by so doing compel the implement to pursue a direct course. At the same time the said guide-wheel runs clear of the crop. That portion of the screw-bolt C which occupies the slot of the lower of the pair of overlapping bars has a non-circular shape, as shown at $c$ in Figs. 2 and 3, by which means the guide-wheel G is at all times maintained in a position at right angles to said bar, so as to preserve the proper obliquity, as stated. The scraper H serves to remove from the guide-wheel any earth or other matter that may adhere to it.

Both sets of shares K K' and L L' may be adjustable, as to depth and angle, by customary slots and nuts, M N, and be held to such adjustment by the usual braces, O. By increasing the depth or the angle of the covering-shares L L' relatively to the scraping-shares K K', the implement may be enabled to cover more deeply. Studs P P', which project inwardly from the rear sheath or standards Q Q', serve as pivots for the attachment of hangers R R' of a floating or gravitating roller, S. The roller S is hollow, and has in one end an aperture, $s$, closable by a screw-plug, T, to enable the insertion of sand or other heavy substance, by which said roller may be given any weight from twenty up to one hundred or more pounds. A scraper, U, attached to the hanger R, serves to remove all adhering matter from the roller S. As this roller will not be at all times required or desirable, I have so arranged the parts as to make it easily removable, by simply slackening the rear nut D' and spreading the rear end of the frame, and springing inward an arm, R', of the hanger R, as shown in Fig. 4.

I claim as new and of my invention—

1. The combination of the expansible frame A A' B, clevis I, wheel-bracket E, and clamp bolt and nut C D connecting the whole, substantially as set forth.

2. The combination of the separable roller S, hangers R R', and studs P P' with the standards Q Q' and expansible frame A A' B, substantially as set forth.

In testimony of which invention I hereunto set my hand.

FRIEDRICK DIETZ.

Attest:
 GEO. H. KNIGHT,
 JAMES H. LAYMAN.